United States Patent [19]

Gilbert

[11] Patent Number: 5,340,597
[45] Date of Patent: Aug. 23, 1994

[54] METHOD FOR BREWING COFFEE

[75] Inventor: Jack J. Gilbert, Roswell, Ga.

[73] Assignee: Industria Colombiana de Electronicos y Electrodomesticos, Incelt S.A., Carrera, Colombia

[21] Appl. No.: 49,747

[22] Filed: Apr. 19, 1993

Related U.S. Application Data

[62] Division of Ser. No. 774,077, Oct. 9, 1991, Pat. No. 5,265,517.

[51] Int. Cl.⁵ ............................... A23F 5/26
[52] U.S. Cl. ........................ 426/433; 99/280
[58] Field of Search .............. 426/433; 99/280

[56] References Cited

U.S. PATENT DOCUMENTS

| | | |
|---|---|---|
| 1,789,334 | 1/1931 | Englund . |
| 1,869,720 | 8/1932 | Strand et al. . |
| 1,963,476 | 6/1934 | Smith ............................. 99/302 C |
| 2,802,574 | 8/1957 | Schweppe . |
| 3,025,781 | 3/1962 | Bossi . |
| 3,128,691 | 4/1964 | Carrillo . |
| 3,233,535 | 2/1966 | Fowlie . |
| 3,344,733 | 10/1967 | Herrera . |
| 3,812,773 | 5/1974 | Hultsch . |
| 3,967,546 | 7/1976 | Cailliot . |
| 4,074,621 | 2/1978 | Cailliot . |
| 4,204,964 | 5/1980 | Cailliot . |
| 4,464,982 | 8/1984 | Leuschner et al. . |
| 4,473,002 | 9/1984 | Leuschner et al. . |
| 4,476,776 | 10/1984 | Greutert et al. . |
| 4,545,296 | 10/1985 | Ben-Shmuel . |
| 4,641,572 | 2/1987 | Varga . |
| 4,962,693 | 10/1990 | Miwa et al. . |
| 5,265,517 | 11/1993 | Gilbert ............................. 99/280 |

FOREIGN PATENT DOCUMENTS

| | | |
|---|---|---|
| 3231038A1 | 2/1984 | Fed. Rep. of Germany . |
| 3241606A1 | 3/1984 | Fed. Rep. of Germany . |
| 3241603A1 | 5/1984 | Fed. Rep. of Germany . |
| 3529053A1 | 2/1987 | Fed. Rep. of Germany . |
| 813799 | 5/1959 | United Kingdom . |
| 1506074 | 4/1978 | United Kingdom . |
| 2103501 | 2/1983 | United Kingdom . |

*Primary Examiner*—Joseph Golian
*Attorney, Agent, or Firm*—Morgan & Finnegan

[57] ABSTRACT

Disclosed is a coffee brewing apparatus and method for brewing coffee which employs a rotating basket and other appropriate support structure. The rotating basket is subjected to centrifugal acceleration and water containing caffeol is selectively extracted from water and ground coffee present in the basket. The water and caffeol extracted from the ground coffee exits from the basket through a plurality of ports disposed around the circumference thereof, is directed through a discharge passageway and is collected in a receptacle.

In accordance with the method a preselected amount of ground coffee is introduced into the basket which is subjected to centrifugal acceleration. A preselected amount of water at a predetermined temperature is added to the basket in order to form a coffee grounds-water mixture and an aqueous solution containing caffeol but not the coffee grounds is selectively removed from the basket through the plurality of circumferential ports located in the wall of the basket. Centrifugal acceleration is continued until essentially all of the aqueous solution present in the basket has been separated from the ground coffee, removed from the basket and collected in the receptacle.

7 Claims, 8 Drawing Sheets

METHOD FOR BREWING COFFEE

This is a divisional of co-pending application Ser. No. 07/774,077 filed Oct. 9, 1991 now U.S. Pat. No. 5,265,517.

FIELD OF THE INVENTION

The present invention relates to a method and apparatus for brewing coffee. More particularly, the invention relates to a method and apparatus for selectively extracting by centrifugal acceleration caffeol from an aqueous solution containing coffee grounds.

BACKGROUND OF THE INVENTION

Coffee is a beverage which is brewed by extracting water soluble flavor and aroma components from roasted coffee beans. The essential flavor and aroma component in coffee is caffeol, an oil that is partially soluble in water. Thus coffee extract is principally a caffeol-water emulsion containing minor amounts of other flavor and aroma components. Because roasted coffee beans have a rigid structure, they are usually milled or ground to form coffee grounds typically ranging in size from about 30 to 200 mesh (U.S.A. sieve series). This substantially increases the surface area of the coffee grounds available for extraction.

Various apparatuses are known for automatically brewing coffee. One type of coffee brewing apparatus is a drip type coffee maker in which preheated water filters through coffee grounds by gravity. In the drip type coffee maker, water preheated to just below its boiling point is introduced at the top of a static bed consisting of coffee grounds and flows through the static bed by the force of gravity. The forces exerted on the static bed by gravity and the water compact the bed leading to water channelling through and uneven wetting of the static bed. This in turn results in uneven and incomplete extraction of caffeol from the coffee grounds.

Another type of coffee brewing apparatus is a percolation type coffee maker. In the percolation type coffee maker, boiling water or steam is repeatedly passed through a quantity of coffee grounds for a predetermined time period. However, a major disadvantage of repeatedly passing water through the coffee grounds is that an undesirable or less than optimum taste develops in the coffee extract.

Still another type of coffee brewing apparatus confines the coffee grounds in a rotating housing and uses centrifugal force to filter preheated water through coffee grounds. For example, U.S. Pat. No. 3,967,546 to Cailliot describes a coffee brewing apparatus in which a bottom retractable disc and an upper retractable cone form a rotatable holder driven by a gear mechanism for a coffee grounds-liquid mixture. A 0.2 mm gap between the disc and the cone acts as a filter to separate the liquid from the coffee grounds. When the rotation stops, the bottom retractable disc disengages from the cone allowing the coffee grounds to be removed from the cone.

U.S. Pat. Nos. 4,473,002 and 4,464,982 to Leuscher describe a centrifugal type coffee brewing apparatus having a receptacle for holding coffee grounds. When the receptacle is rotated, water is transferred from a water container directly below the coffee grounds receptacle upward and into the ground coffee receptacle. The coffee grounds receptacle contains a slot in its upper portion which serves to separate the liquid from the coffee grounds.

U.S. Pat. No. 3,233,535 to Fowlie also describes a centrifugal type coffee brewing apparatus in which hot water is fed into the upper portion of a brewing case containing coffee grounds before centrifugal rotation of the brewing case begins. The feeding of hot water into the upper portion of a brewing chamber containing coffee grounds before centrifugal rotation of the brewing chamber at 5,000 rpm also is described in U.S. Pat. No. 4,962,693 to Miwa et al.

However, prior to the present invention, rotating or centrifugal type coffee makers, did not produce coffee having the proper amount of flavor and aroma components due to a failure to wet all surfaces of the coffee grounds or failure to drive the water into the coffee grounds, and/or failure to selectively extract caffeol from an aqueous solution containing coffee grounds.

There exists, therefore, the need for an apparatus and a method for brewing coffee which do not exhibit the above-mentioned disadvantages, as well as other disadvantages inherent therein. The present invention fulfills this need.

BRIEF STATEMENT OF THE INVENTION

The present invention relates to a method and apparatus for brewing coffee using centrifugal acceleration. In one aspect, the invention relates to an improvement in a coffee brewing apparatus including a support structure for supporting means for receiving brewed coffee from a coffee brewing means provided with a predetermined amount of coffee to be brewed and which is in communication with said receiving means, water heating and feeding means for delivery of a predetermined amount of heated water at a predetermined temperature to said brewing means and control means for sequentially energizing and de-energizing said heating and feeding means, the improvement comprising:

(a) a housing having a base member and an upwardly-extending wall attached to said base member which define a chamber;

(b) a substantially cylindrical basket means having a base member and a frustro-conically shaped wall attached to and extending upwardly from said base member at a preselected angle relative to the central axis of said basket means and terminating in an outwardly extending upper edge, a plurality of ports disposed around the circumference of said frustro-conically shaped wall in the vicinity of the upper portion thereof and substantially equidistant from said base member, said basket means being removably and rotatably mounted in spaced relationship in said chamber of said housing and substantially coaxially aligned with said housing, the walls of said housing and said basket defining an annular space forming a discharge passageway which communicates at one end with said ports and at the other end with said means for receiving brewed coffee; said basket means including means for shrouding part or all of said ports and deflecting in a downward direction water and water containing caffeol exiting said ports, said shrouding and deflecting means being disposed in said discharge passageway in the vicinity of the level of said ports;

(c) first and second stabilizing means located in the bases of said housing and said basket means and in the vicinity of the upper edge of said basket means for stabilizing said basket means in the x, y and z directions during rotation thereof around its central axis, said second stabilizing means including drive means for rotating said basket means, and said control means being adapted to sequentially energize and de-energize said drive means and rotate said basket means around its central axis at a preselected speed to a preselected centrifugal acceleration in coordination with the feeding and heating of water to said coffee brewing means.

In another aspect, the present invention also relates to a coffee brewing method which comprises the steps of:

(a) adding a preselected amount of coffee grounds to a frustro-conically shaped basket;

(b) applying a centrifugal acceleration between about 280 rpm and about 350 rpm to said basket and substantially evenly dispersing said coffee grounds in a radially outward direction along the bottom of the basket and forcing said coffee grounds to rise along the wall of said basket to a predetermined level;

(c) uniforming dispersing a preselected and controlled amount of water at a predetermined temperature onto the coffee grounds in said basket and forming a coffee grounds-water mixture, the ratio of the water to coffee grounds in said basket being between about 17.5 ml water per gram coffee grounds and about 19 ml water per gram coffee grounds;

(d) maintaining the centrifugal acceleration and forming an aqueous solution consisting of essentially caffeol and water which rises along the wall of said basket to said predetermined level;

(e) selectively removing said aqueous solution but not said coffee grounds from said basket through a plurality of circumferential ports located in the wall of said basket just below said predetermined level; said ports being substantially equidistantly spaced from the base of said basket and essentially all of the aqueous solution being forced radially outwardly through said ports by said centrifugal acceleration leaving essentially only said coffee grounds in said basket;

(f) continuing said centrifugal acceleration until essentially all of said aqueous solution introduced into said basket has been separated from said coffee grounds and removed from said basket; and (g) collecting the separated aqueous solution in a receptacle.

THE DRAWINGS

In order to understand the invention more fully, reference is directed to the accompanying Drawings which are to be taken with the following detailed description set forth below and in which Drawings.

DESCRIPTION OF THE PREFERRED EMBODIMENTS

Figure 1:
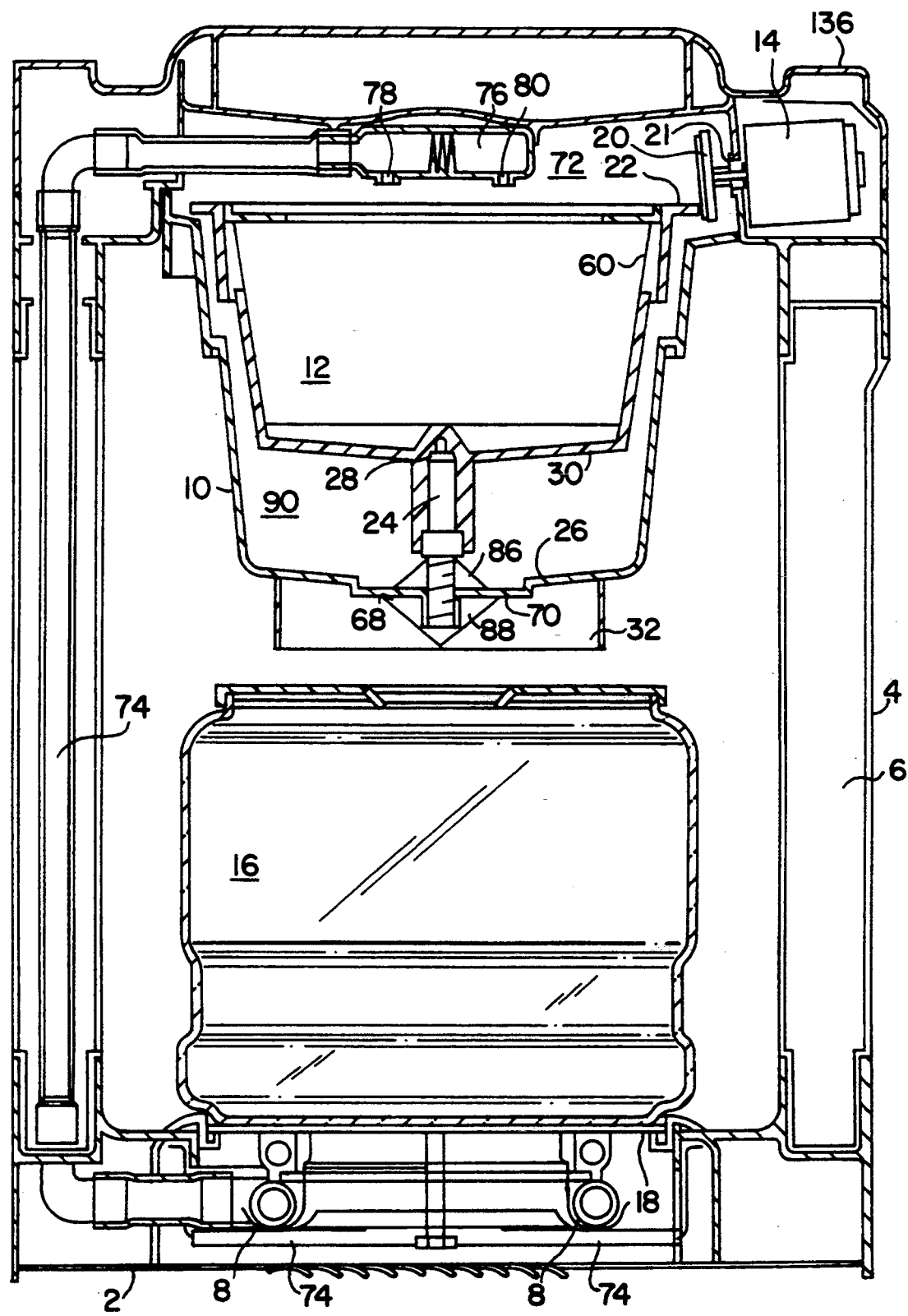
FIG. 1 is a lateral cross-sectional view of a coffee-brewing apparatus according to the invention.

Referring now more particularly to FIG. 1 of the Drawings, there is illustrated a preferred embodiment of a coffee-brewing apparatus constructed in accordance with the present invention comprising as its main components, a support structure having a base 2 and a vertical support arm 4 attached to the base, a liquid reservoir 6, a heater element 8, a housing 10, a basket 12, a motor 14 and a caffeol and water receptacle 16. A heating plate 18 is provided on the base 2 above the heater element 8, on which the receptacle 16 is placed for receiving coffee extract, that is, the caffeol and water. Liquid reservoir 6 is disposed on a side of vertical support arm 4. Liquid in reservoir 6 is in fluid communication with heater element 8.

As seen in FIG. 1, electric motor 14, a horizontal shaft type motor, is pivoted to vertical support arm 4 and has drive wheel 20 located substantially perpendicular to basket 12 and in contact with the circumferential edge of basket drive rim 22 located on the top outer periphery of basket 12. Although drive wheel 20 is located substantially perpendicular to the basket 12, it is disposed at a fixed angle of incidence, the motor weight being used to maintain frictional contact with the drive rim 22, thereby providing a shorter movement of force between the wheel and the rim. This results in pushing the rim, and thus the basket, downwardly into the housing 10 and aids in stabilizing the basket in the x, y and z directions during rotation of the basket. In such an arrangement, it is preferred that the outer peripheral edge of the rim 22 be "rounded". Otherwise, it scarfs and makes noises, as well as tending to decrease the stability of the basket in the x, y and z directions as it is rotated.

Housing 10 is generally of a frustro-conical shape, tapering out in the upward direction and is provided with a drive journal pin 24 integrally formed in the base 26 of the housing. Pin 24 is vertically aligned with the central axis of the housing and directed into the inner area thereof. When pin 24 mates with a pin housing 28 integrally formed in base 30 of basket 12, pin 24 in cooperation with pin housing 28 and drive wheel 20 of motor 14 serves to stabilize basket 12 in the x, y, and z directions during rotation of the basket. In this connection, it is to be noted that it is within the purview of this invention to provide the top of the pin housing 28 with a wear bushing (not shown) and the bottom of the pin housing 28 with a load bushing (not shown). The journal pin 24 may be set in its axis in any commercial manner, such as by sonically setting it in place on its axis in the bottom of the housing mold in place or mechanically locked in place in the bottom of the housing along its axis.

The housing 10 further includes a circumferential skirt 32 which allows the housing to be set flat on a counter. The bottom of housing 10 has a plurality of openings 68 and 70 circumferentially spaced around the perimeter of the cone 88 and the bottom of the housing 10 gently slopes downward toward the openings 68 and 70 through which extract present in the housing 10 is discharged into the receptacle 16. If desired, the housing may be pivotally mounted to vertical support arm 4 or simply adapted to be frictionally held in the support structure. As seen FIG. 2, in a preferred construction, basket 12 has a frustro-conical shape flaring out in the upward direction with a periphery disposed at preselected angles relative to the central axis thereof.

In such a modification, the construction of basket 12 is akin to a frustro-conical shape having a lower portion 34 whose circumference is smaller than the circumference of the upper portion 36 with the two portions being joined by a plurality of spaced peripheral tabs or ribs 38, 40, 41 and 44 extending from and connecting the upper peripheral circumferential edge of lower portion 34 to the lower peripheral circumferential edge of upper portion 36. Spaced disposition of the tabs or ribs, as described above, results in the formation of a plurality of circumferential ports or slots 46, 48, 50, 52 and 54 which are sized by the disposition of the tabs or ribs to provide a preselected cross-sectional area and location to give a preselected residence time in the basket of a hot liquid, that is, a liquid-ground coffee mixture or caffeol.

Figure 3:
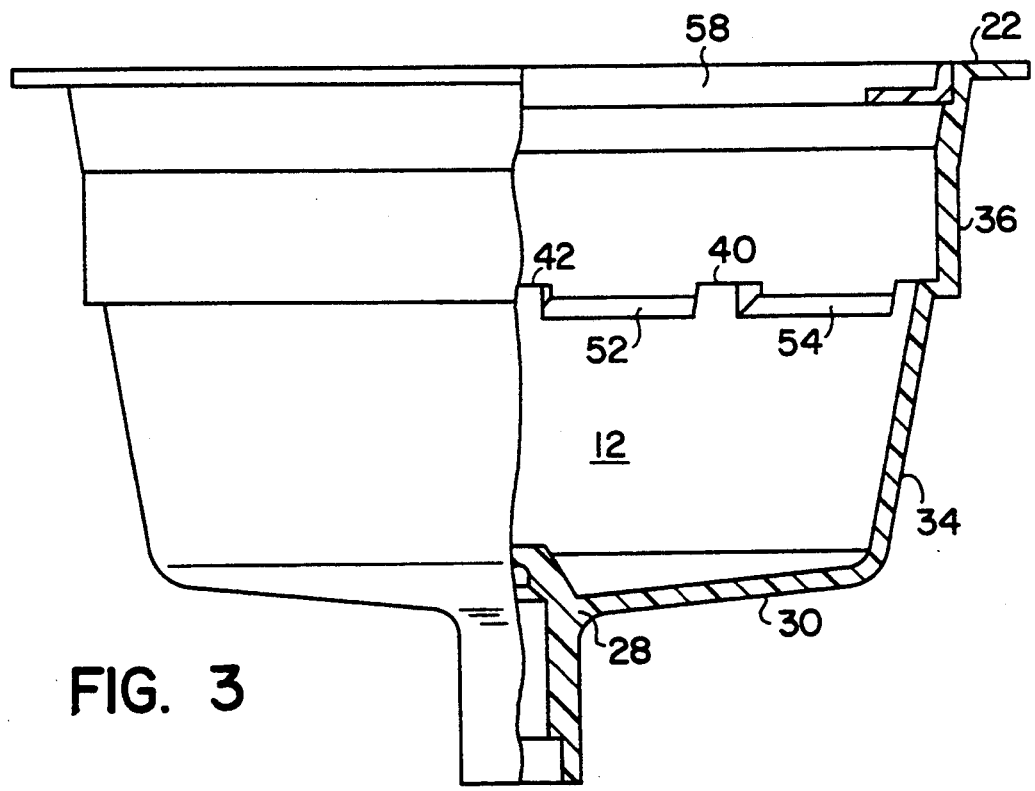
FIG. 3 is an enlarged partial cross-sectional lateral view of the lower portion of the brewing basket illustrated in FIG. 2.

The tabs or ribs 38, 40, 42 and 44 are disposed at a preselected angle downward to decrease the velocity of the coffee extract exiting through the ports 46, 48, 50, 52 and 54 and thereby prevent and/or limit any further upward migration of the liquid and caffeol on the wall of the basket. The preselected angle is between about 4 and 10 degrees with respect to the central axis of basket 12, as shown in FIG. 3, although it is within the purview of this invention that the tabs or ribs can be in a plane at a right angle to the central axis of the basket 12.

Figure 2:
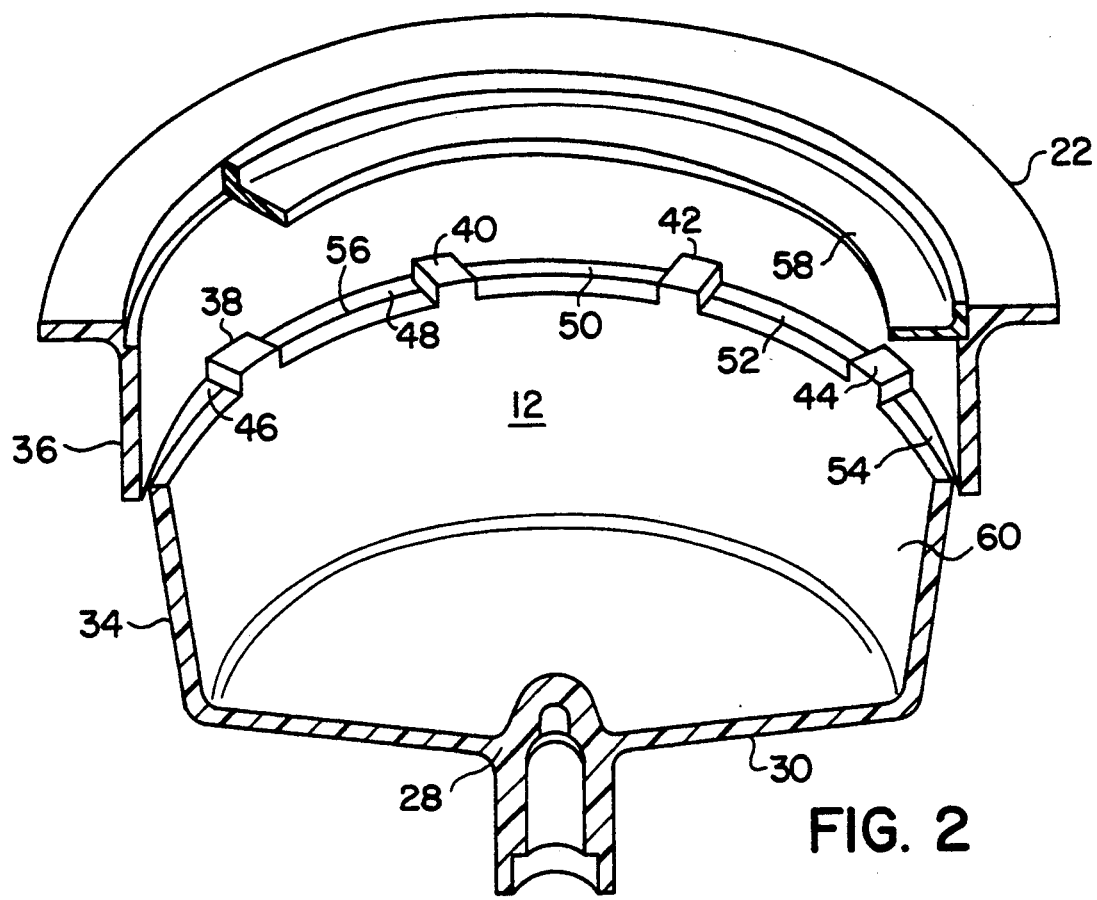
FIG. 2 is an enlarged partial cross-sectional view in perspective of a brewing basket of the apparatus illustrated in FIG. 1.

In a further preferred modification of the invention, the ports or slots may be covered with a microscreen 56, as shown, for example, in FIG. 2.

Basket 12 also is provided with a snap-in ring 58 which is disposed above the ports and prevents liquid and coffee grounds from rising too high in the basket and which also securely holds in place in the basket a filter 60, as well as with basket drive rim 22 mentioned above.

It is to be understood that it is within the purview of this invention that the cylindrical wall of basket 12 may be constantly and evenly flowed outwardly in the upward direction progressively increasing in circumference and the ports or slots 46, 48, 50, 52 and 54 may be spaced around the circumference thereof in the upper portion of the wall, separated from each other by ribs or tabs 38, 40, 42 and 44. Basket 12 utilized for brewing operations, is sized to be removably mounted and centrally disposed within housing 10.

Figure 2A:
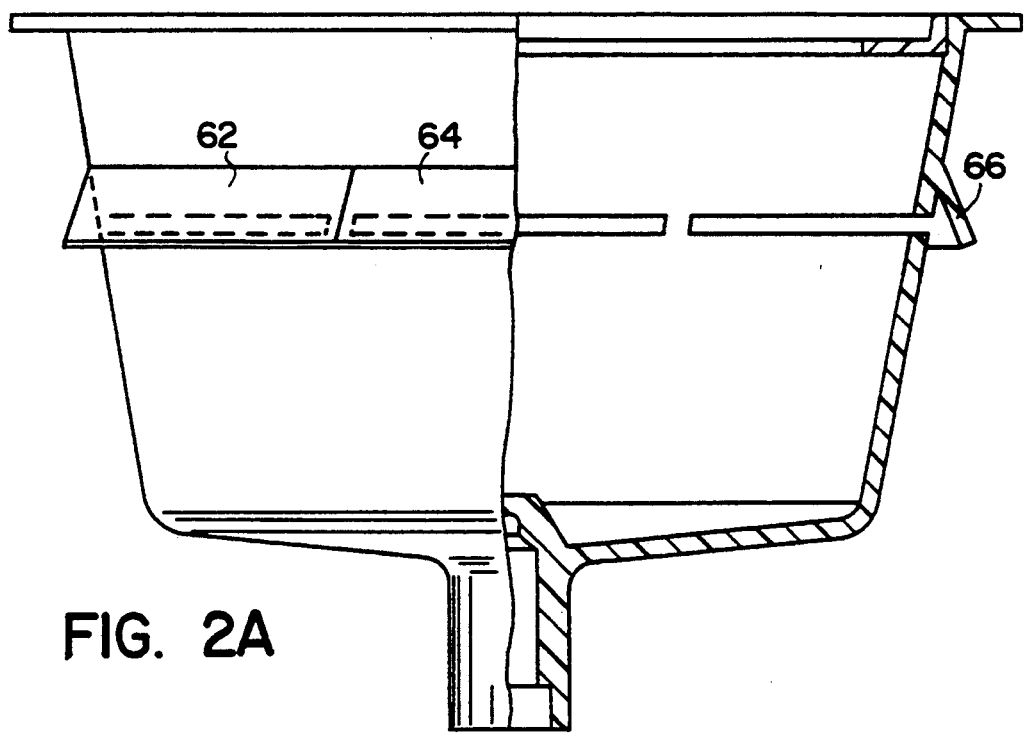
FIG. 2A is an enlarged partial cross-sectional view in perspective of a modification of a brewing basket showing ports disposed in the plane of the wall of the basket having a circumferentially disposed louver extending outwardly and downwardly over the ports at an angle.

An additional modification of basket 12 includes a plurality of radial ribs (not shown) secured to the outside bottom of basket 12 and outside surface of the molded base 30. Such ribs extend radially outwardly from the central axis of the basket and serve to direct extract toward the bottom outlet of housing 10. A further preferred modification of basket 12 is the provision of a plurality of sling louvers 62, 64 and 66 extending from the outer circumferential wall of basket 12 directly above the ports or slots and extending downwardly over them at an angle of about 45° measured from the central axis of the basket, as shown in FIG. 2A. These louvers serve to reduce the velocity of the extract and deflect the extract downwardly. If desired, one continuous louver may be disposed around the basket, rather than a plurality.

Housing 10, as shown in FIG. 1, has an upper open end and a plurality of openings 68 and 70 providing passages at the bottom through which extract discharges. A hot liquid delivery area 72 is provided above basket 12. The hot liquid delivery area 72 is in fluid communication with heater element 8 by a tube and has an outlet 34 centrally disposed above basket 12. Liquid discharge ports 78 and 80 are located at a bottom of hot liquid delivery area 72.

Figure 4:
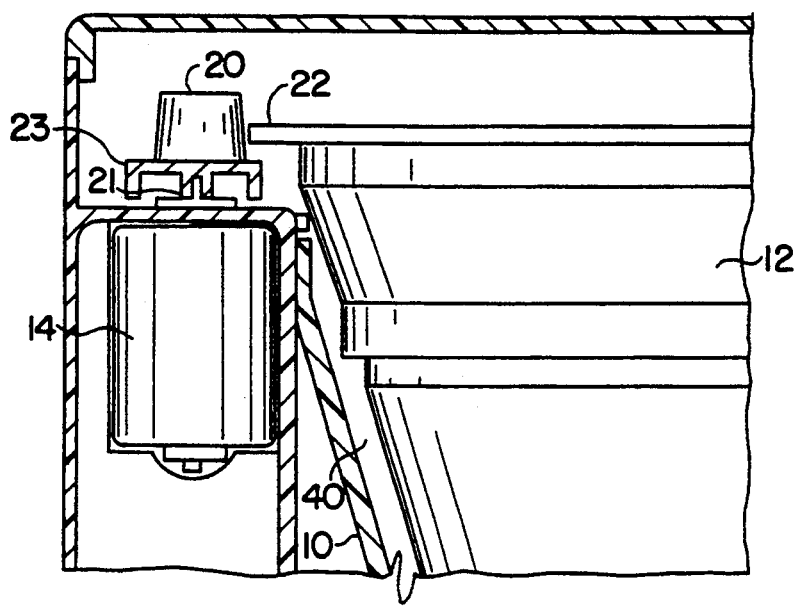
FIG. 4 is an enlarged partial cross-sectional lateral view of the motor assembly, drive journal and centrifuge drive rim of an alternative embodiment of the apparatus illustrated in FIG. 1.

Referring now to FIG. 4, shown is an alternative embodiment of the drive motor 14 fixed to the supporting structure but employed in a vertical disposition. In this embodiment, the drive wheel 20 fixed to shaft 21 has a conical shape and its outer edge contacts the outer edge of the drive rim 22 of the basket 12. Such an arrangement provides a somewhat more compact and aesthetically pleasing construction while still providing an apparatus which operates in the same manner as that described above. Due to the vertical disposition of the drive motor, however, smoother operation of the device is attained since vibrations from the motor and, as well, from the rotation of the basket are less disturbing and noticeable, being more evenly distributed throughout the support structure while at the same time providing the necessary ratio to maintain the desired rotational speed of the basket. In addition, this results in greater stability of the basket 12 in the x, y and z planes.

Figure 5:
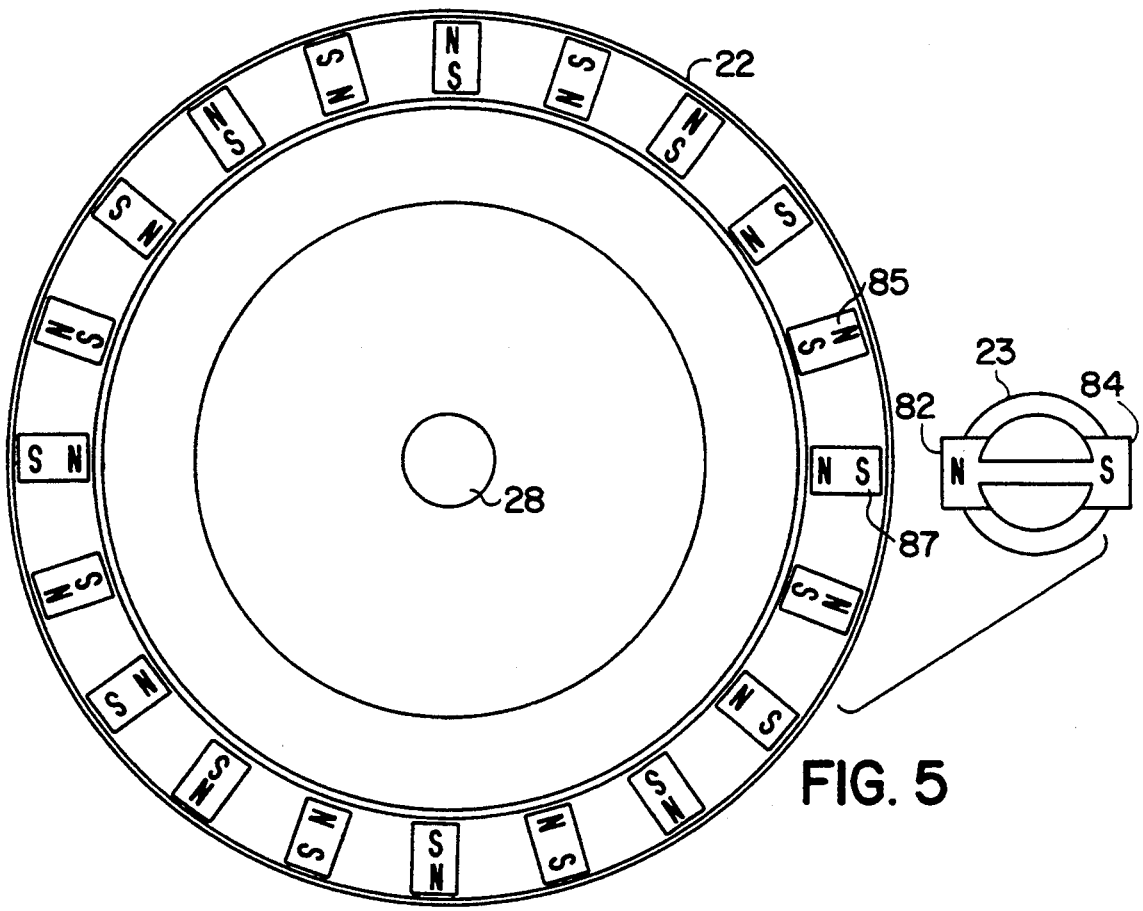
FIG. 5 is a diagrammatic sectional plan view of an alternative embodiment of a centrifuge drive rim and drive journal showing permanent magnets located therein.

In a further variation of this embodiment of this invention, as shown in FIG. 5 and which may be likewise incorporated into the embodiment illustrated in FIG. 1, the fly wheel 23 of motor 14 and the drive rim 22 of the basket are provided with a plurality of magnets 82, 84, 85 and 87. Magnets such as 82 and 84 may be disposed on the surface of the flywheel of the motor or in the surface of the drive wheel 20 itself. Such magnets are spaced apart from each other and distributed around the circumferences of the flywheel, drive wheel or cone and the drive rim in an alignment so that alternated poles thereof cooperate with each other to establish a magnetic field between the drive rim and the motor elements to cause the basket to rotate about its central axis.

Alternatively, if desired, the magnets 86 and 88 disposed in the drive rim 22 may be disposed in the cylindrical wall of the basket 12 to achieve the same purpose. In this connection, it is within the purview of this invention to distribute the magnets perpendicularly or parallel to the center line of the apparatus in an alternating polarity arrangement. For example, six polarity changes, that is 20 magnets in the exciter may be employed (FIG. 5). Exemplary magnets which may be used are aluminum-nick-cobalt permanent magnets having about a 28 lb. pull, or individual magnets or bipole individual magnets with six segments of reverse polarity.

Figure 6:
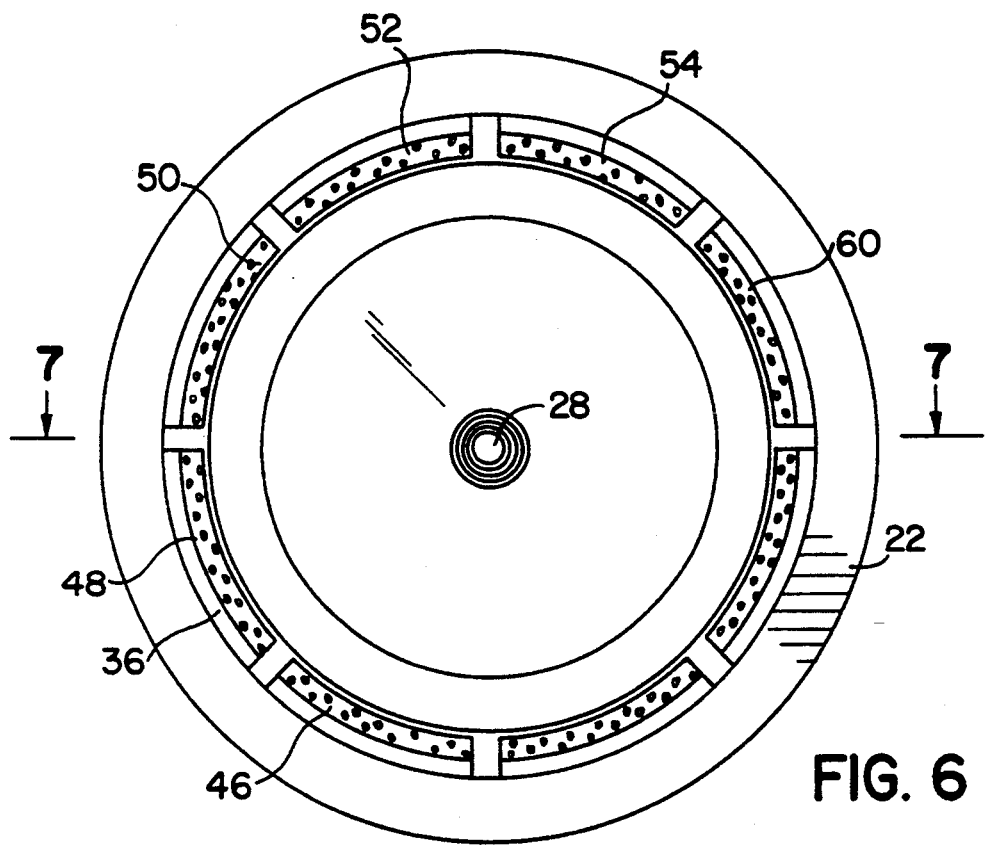
FIG. 6 is a bottom view of the brewing basket illustrated in FIG. 1 showing a preferred disposition of the circumferential ports and having a ring filter disposed over the same.
Figure 7:
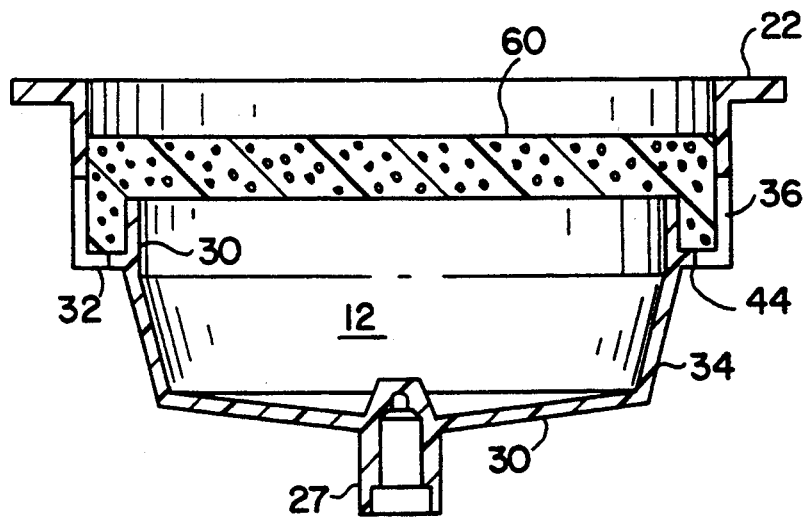
FIG. 7 is a sectional view of the basket illustrated in FIG. 6 which is taken across Line 7—7 of FIG. 6 and showing the upwardly extending lip located on the interior surface of the wall of the basket and between which lip and the basket and between which lip and the basket wall the ring filter is supported.

Considering next the alternative embodiment of basket 12 shown in FIGS. 6 and 7, the ribs 38 and 44 extend in a plane at a right angle to the central axis of the basket, connecting the lower portion 34 with the upper portion 36. The filter 60 in this embodiment is in the form of a ring which is held in place over the ribs and ports or slots 46, 48, 50, 52 and 54 by an internally disposed supporting rib 82 which extends circumferentially around the interior of the basket, being spaced from the interior circumferential surface of the basket. In this embodiment of an apparatus, according to the invention, supporting rib 82 is formed simply by increasing the upward extent of the wall of the lower portion 34 of the basket, or simply connecting the ribs 38 and 44 to the lower portion 34 of the basket at a point below the upper edge thereof which is sufficient to provide an internal circumferentially extending supporting rib 82.

Returning once again to FIG. 1, as may be seen therefrom, housing 10 and basket 12 have preferably frustroconically shaped configurations and are sized so that the basket can be inserted in the housing with the upwardly extending exterior wall surface of the basket being spaced from the upwardly extending interior wall surface of the housing, thus forming an annular discharge passageway 90 having sloping walls which direct liquid and caffeol exiting the basket downwardly in the discharge passageway and through the holes or openings 68 and 70 in the bottom of the housing. The bottom 26 of housing 10 is substantially planar, but also may be moderately concave, and is provided with an upwardly extending cone-shaped element 86 disposed on the interior surface of the bottom and around the pin 24 which also aids in directing the flow of liquid and caffeol through the holes or openings in the bottom of the housing.

A similar cone-shaped element 88 extending downwardly disposed on the exterior surface of the bottom of the housing around the pin 24 also is preferably attached thereto. This element also aids in directing liquid and caffeol which passes through openings 68 and 70 into the discharge spout 32 and into the receptacle 16. Liquid and caffeol flows through openings 68 and 70 and by capillary action and/or surface tension flows downwardly along the tapered conical surface of element 88 centralizing the liquid passing through openings 68 and 70 and into the receptacle 16.

If desired, the bottom of the housing may be provided with legs (not shown) to allow the housing to stand upright when it is removed from the support structure of the apparatus.

As previously pointed out, housing 10 may be pivotally mounted to vertical support arm 4 or simply adapted to be frictionally fitted and held in the support structure, thus being easily removable for cleaning.

The basket and housing, as well as the support structure may be made of a wide variety of materials, such as plastics and metals which are generally used in the food industry. Generally, suitable materials are those which do not impart adverse taste or leach into the consumable products being processed therewith, as well as being easily cleaned and capable of withstanding temperatures at least as high as and in excess of the boiling point of water, that is, 100° C. It is preferred that the material possesses inherent lubricity.

Suitable plastic materials may be selected from, but are not limited to, amorphous thermoplastics such as polyvinyl chlorides (PVC), styrene-acrylonitrile resins (SAN), acrylonitrile-butadiene-styrene (ABS) resins, polystyrenes, phenylene oxide-based plastics, polycarbonates and polysulfones; semicrystalline thermoplastics such as nylon, polyolefins, such as polyethylene and polypropylene, acetals, fluoropolymers, e.g., polytetrafluoroethylene (PTFE), and thermoplastic polyesters; thermoset with transition plastics such as epoxy resins, ureas, alkyds, thermosetting polyesters and diallyl phthalate; thermoset without transition plastics, such as, phenolics, melamines and silicones, and copolymers and blends thereof, including glass and/or mineral reinforced blends thereof. Preferred plastic materials are acetals, polypropylenes, polycarbonates, ABS polymers and copolymers, polysulfones, and polyetherimides, acetals, polypropylenes, polycarbonates, and FDA approved elastomeric materials such as silicone.

Suitable metallic materials include, but are not limited to, stainless steel and stainless steel coated iron and iron alloys, aluminum and copper and copper alloys coated with stainless steel and the like. Among these materials, acetals, polypropylene, polycarbonates, polyetherimides and stainless steel are particularly preferred materials.

The bottom 30 of the basket 12, which is removably mounted in the housing 10 and coaxially aligned therewith, like the bottom of the housing 10, is substantially planar (or may be concave) and may be provided with a plurality of holes or openings (not shown) disposed around the central axis thereof which are sized to permit the discharge therethrough of brewed coffee, but not coffee grounds. Moveover, both the housing and basket may be provided with a plurality of ribs (not shown) disposed on the exterior surfaces of their bottoms or bases which extend radially outwardly from their central axes.

As previously stated above, both the housing 10 and basket 12 have frustro-conical shaped walls extending upwardly from their bottoms or bases. The angle of slope of the walls is generally in a range of from about 5° to about 12° from their central axes. Preferably, however, the angle of slope of the walls is in a range of from about 8° to 9°. This is so particularly with respect to the angle of slope of the basket wall in order to achieve most efficient brewing of coffee with the apparatus of this invention. The reason for this is that when the basket is rotated with a bed of coffee grounds and water present therein, centrifugal acceleration forces move the bed of coffee grounds and the water radially outwardly towards the wall of the basket and upwardly along the wall towards the ports through which water and caffeol is discharged into the discharge passageway 90 and then to the receptacle 16 by way of the openings in the base of the housing. The coffee grounds should not migrate upwardly so much that they block the ports.

The angle of slope of the basket wall, the amount of coffee grounds and water in the basket and the speed of rotation of the basket are dependent on one other and determine the extent the coffee grounds and water migrate upwardly in the basket. The speed of rotation of the basket can be decreased or increased to provide centrifugal forces imparting the desired flow pattern to the bed of coffee grounds and water in the basket at a particular angle of slope, as well as to provide the most efficient contact time between the water and coffee grounds and the most efficient and desirable wetting and extraction of flow components from the coffee grounds.

Uniformity of control of brewing conditions with respect to delivery of water to the basket at the most desirable temperature and in amounts for the most efficient extraction of components from a particular amount of coffee grounds in the basket, as well as the slope of the angle of the basket, the speed of rotation of the basket and the location, number and size of the ports are desirable and dependent upon one another in order to provide a coffee product of the most desired consistency in repetitive operation of the apparatus according to the invention.

The particular speed of rotation for a particular amount of coffee grounds and water in a basket having a particular angle of slope is readily determinable by routine experimentation following the principles set forth herein. In general, it has been found that if the angle of slope of the basket is increased and a particular amount of coffee grounds and water is present in the basket, the speed of rotation of the basket should be increased in order to achieve the desired pattern of migration wetting of coffee grounds and extraction of flavor components from the grounds in the basket. Conversely, if the angle of slope is decreased and the same amount of coffee grounds and water are present in the basket, the speed of rotation should be decreased and the desired pattern of migration of the grounds and water, as well as wetting and extraction, in the basket may be achieved.

While the range of the speed of rotation of the basket vary widely from about as low as 200 rpms to as high as about 500 rpms, speeds of rotation of the basket below about 200 rpms are impractical because it would take excessive amount of time to wet a bed of coffee grounds in the basket and obtain the extraction. On the other hand, rotational speeds in excess of 500 rpms are likely to result in the bed of coffee grounds climbing the wall of the basket at an uncontrollable rate and going beyond the ports carrying entrained coffee grounds. To compensate for this effect, one could increase the height of the basket but there is no practical reason to utilize a larger basket when the same effect can be achieved at lower speeds. Generally, speeds of rotation of the basket about its central axis above about 200 rpm, preferably above about 280 rpm and speeds of rotation below about 500 rpm, preferably below about 400 rpm, and more preferably below about 320 rpm, can be employed in the operation of a brewing apparatus according to the invention. The most efficient speed for a small consumer-type unit (2 cup size) up to large commercial-type units (100 cup size) being readily determinable in accordance with this invention.

The size, number and location of the ports is also readily determinable by experimentation. In general, the size of the area of the ports should be as large as possible while, at the same time, maintaining liquid in the basket to maximize extraction. The ports should be located on the sloping wall of the basket at a point high enough from the bottom of the basket so that coffee grounds migrating upwardly in the basket will not block the same, as well as to allow for complete wetting and extraction of the coffee grounds. Insofar as the number of ports is concerned, the lower the number, the larger the area of the individual ports. As much open area as possible should be provided.

In an ideal situation, one continuous port around the circumference of the basket at the point above the lower and upper portions of the basket meet each other would be the best arrangement. However, such an arrangement would not provide for a connection between the upper and lower portions of the basket. Consequently, at least two supporting ribs or tabs, such as 38 and 40 are needed to join the upper and lower portions of the basket. On the other hand, in order to provide a basket construction having good strength and durability under the condition of use, four to six ribs such as 38 and 40 are provided, as a practical matter, and in a basket so constructed sufficient wetting of the coffee grounds and egress of caffeol and liquid through the ports is achieved.

As a practical matter, it has been found that in a small consumer-type size brewer constructed in accordance with the invention, and in which the basket is sized to utilize 74 grams of coffee grounds and 1333 ml of water to provide up to 10 cups of coffee and in which the angle of slope of the basket wall is approximately 9° to 10° and with the speed of rotation being between 280 and 350 rpm, preferably about 310 rpm, the ports should have a length of about 0.10" and be distributed around the circumference of the basket about 1.0 inch higher than the highest level the grounds reach in their upward migration along the basket wall, and approximately $3\frac{1}{2}$ inches from the bottom of the basket. When so constructed and operated, premature extraction is avoided and substantially complete wetting and extraction are achieved at the given speed of rotation and, as well, consistently provide ten cups of coffee, both the apparatus and product complying with the requirement of Publication Nos. 126 and 128 of the Coffee Brewing Center of The Pan-American Coffee Bureau, New York, N.Y., published in 1972 and 1973 and incorporated herein by reference.

Figure 8:
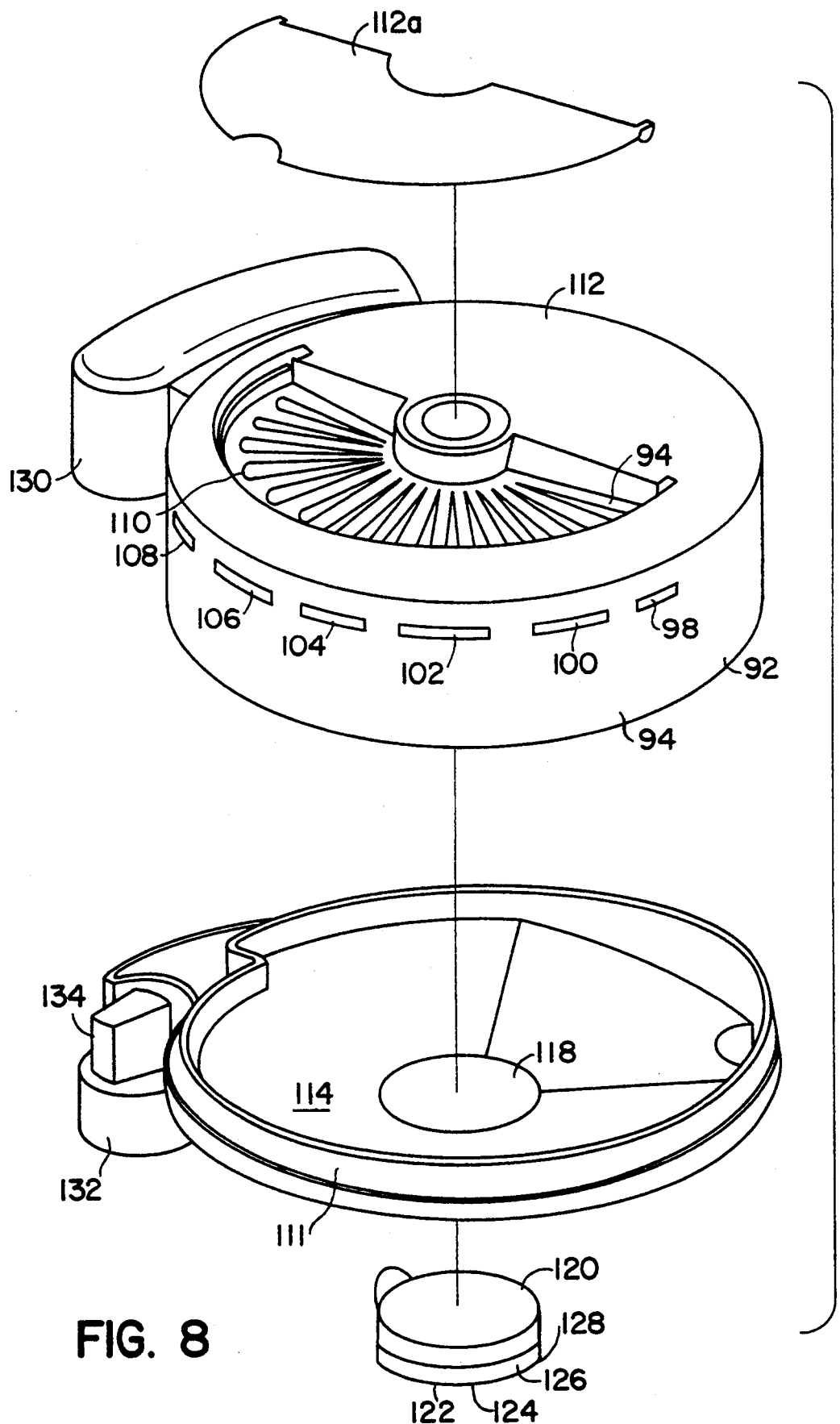
FIG. 8 is an exploded view of a top cover for the coffee brewing apparatus shown in FIG. 1 and the arrangement for swinging the same out of and into position over the basket and housing.

Referring next to FIG. 8, a top lid or closure member 92 may be utilized in an apparatus according to this invention. The lid 92 comprises a recessed top portion 94 and a downwardly depending circumferential skirt 96. A plurality of circumferential slots 98, 100, 102, 104, 106 and 108 are disposed around the top portion of the lid. Within the recessed portion a plurality of radically extending slits, such as slit 110 are disposed and the recessed top portion 94 is covered with a closure member, port of which 112a is shown removed to expose the slits, such as 110.

The lid 92 also includes a bottom cover portion 114 having an upwardly extending circumferential rib 116 which is sized to be frictionally fitted to the inner surface of skirt 96 and having a central opening 118 into which a hub 120, provided with a plurality of openings or vents 122, 124, 126 and 128 is frictionally fitted. In its assembled state, the lid is attached to a pivotal support 130 through a hub 132 by way of a boss 134 which fits into an appropriate mating member (not shown) on the inner portion of support 130. The assembled lid is then pivotally fixed to upright member 4 in any convenient manner by fitting hub 132 over an upright member 136 (FIG. 1).

The bottom cover portion 114 of the lid slopes inwardly towards the central axis thereof and the top cover portion 94 containing the slits, such as slit 110, likewise slopes inwardly towards the central axis thereof. The slots, such as 98 et seq and the slits, such as 110 et seq, as well as the vents 122 et seq allow steam rising from the basket 12 to escape to the atmosphere. At the same time, since the recessed cover portion 94 and lower cover portion 114 slope downwardly, any condensation of such steam will flow towards the central axis of the cover and by way of vents 122 et seq. be returned to the basket 12.

Figure 9:
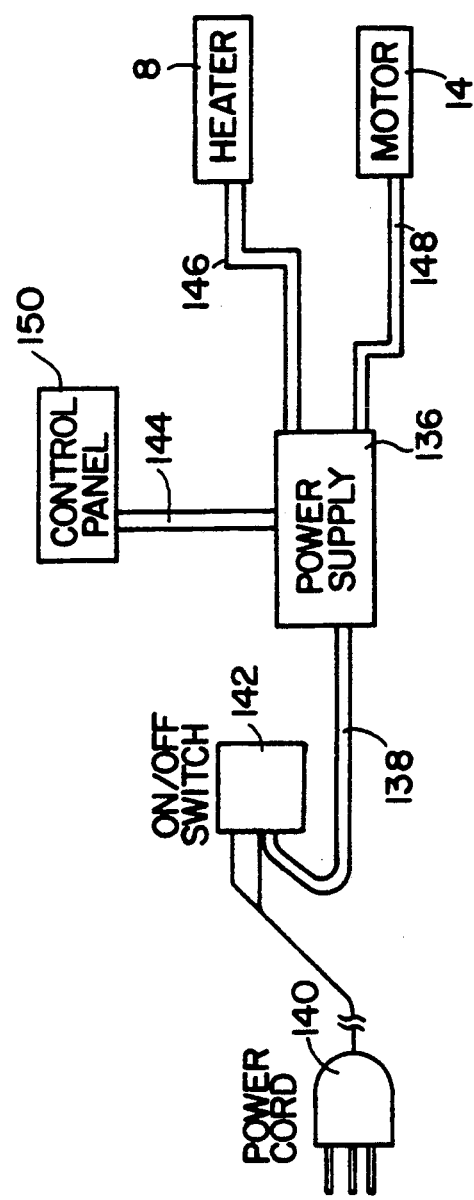
FIG. 9 is a diagrammatic view of a wiring circuit employed in the coffee brewing apparatus illustrated in FIG. 1.

Referring now to FIG. 9, a typical control circuit for use with the apparatus of this invention, as shown diagrammatically, includes a power supply 136 connected to an electrical line 138 which is provided with a bayonet type plug 140 for coupling to a source of electricity (not shown). Electrical line 138 has an on/off switch 142 disposed therein between the power supply 136 and the plug 140. The power supply 136 is also connected by appropriate electrical lines 144, 146 and 148 to control panel 150, heater 8 and motor 14.

Control panel 150 is an off-the-shelf item and may be provided with an appropriate rheostats and thermostats and wiring for automatic operation of the apparatus, as well as control buttons or like means (not shown) to permit manual operation. The heater 8 is preferably provided with two elements, a high heat and a slow heat element such as 8 and 8a (FIG. 1). When the switch 142 is turned on, the high heating element 8 is energized and is thermostatically controlled and water which has been introduced into the tank 6 through an opening (not shown) is preheated to just below the boiling point, that is, to about 192° F. (89° C.), the water flowing from the tank 6 into the pipes 74 and through the water dispersion means 76 from which it is introduced into the basket 12. It generally takes about 3 to 4 seconds to heat the water to the desired temperature as it passes by the heating element.

While the water is so heating, an appropriate timing switch in the control panel also automatically turns on the motor to an appropriate speed of rotation, as set through a button or rheostat (not shown) on the control panel. Thus, water is introduced into the basket in contact with coffee grounds previously introduced into the basket 12. When the period of rotation has been completed, the timing switch in the control panel automatically stops the rotating basket and the heater thermostat continues to cycle to provide a warming mode for the receptacle 16. The high mode heater element 8 is turned off and the low mode heating element 8a switches on to keep coffee in the receptacle 16 warm.

Figure 10:
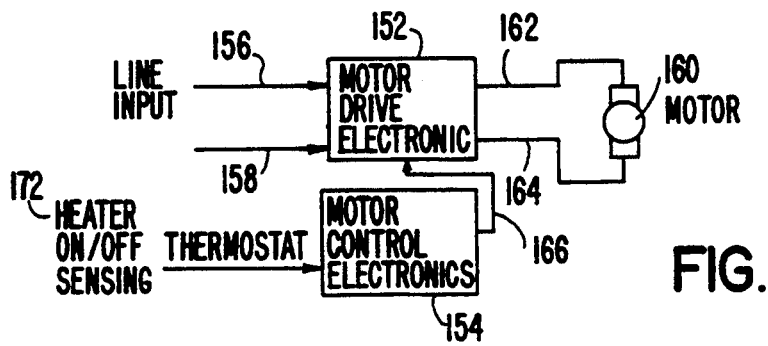
FIG. 10 is a schematic view of a preferred electronic circuitry arrangement used with the apparatus of this invention.
Figure 11:
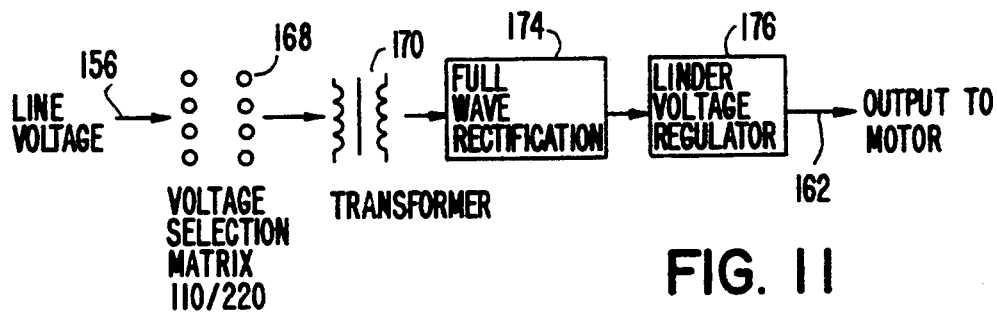
FIG. 11 is a more detailed view of the motor drive electronics illustrated in FIG. 10.
Figure 12:
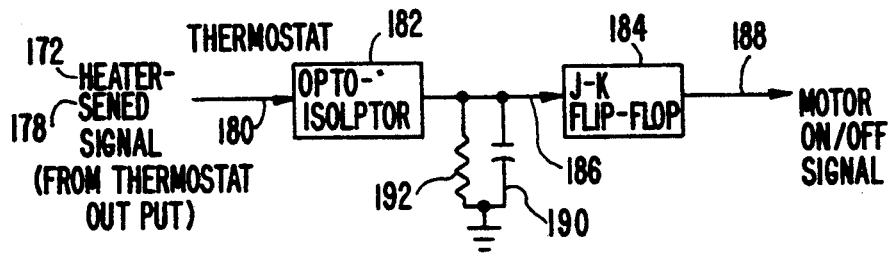
FIG. 12 is a more detailed view of the motor control electronics shown in FIG. 10.

However, a preferred electronic circuit to be used in a coffee maker in accordance with this invention is that schematically shown in FIGS. 10, 11 and 12.

Now referring to these Figures, a preferred control electronic circuitry, as illustrated in FIG. 10, comprises two main sections, that is a motor drive electronic section 152 and a motor control electronic section 154. Motor drive section 152 is connected through input lines 156 and 158 to an external power source (not shown) which may be either 110 volt alternating current or 220 volt alternating current and provides regulated voltage for motor 160, being connected thereto through lines 162 and 164. The motor drive section 152 is also provided with an input line 166 from the motor control electronics 154. The motor drive section 152 is provided with a jumper wire configuration pattern 168 (FIG. 11) that is soldered in during the circuit construction stage to configure a dual winding transformer 170 for the intended input power. The motor control section 154 monitors the coffee maker's heater thermostat 172 providing a delayed motor shut-off after the thermostat 172 opens indicating the end of the brewing cycle and holds the motor in the off position until power is cycled.

The motor drive electronics, as shown in greater detail in FIG. 11 provides the regulator DC voltage used to power the motor which drives the basket and in addition to the input line, such as 156, jumper wire configuration pattern 168 and dual winding transformer 170 also includes, downstream of the transformer, a full wave rectifier 174 having located downstream therefrom a voltage regulator 176 which is connected through output lines, such as line 162 to the motor 160.

Transformer 170 is preferably rated at 10 VCT @0.25A on the secondary or output side and employs a center tap configuration followed downstream by the full wave rectifier 174 and subsequently the voltage regulator 176 and converts raw DC voltage to a regulated DC voltage for use by the motor 160.

One ohm resistors B9 and R10 (not shown) are connected in series with the rectifying diodes (not shown) of the full wave rectifier 174, thus helping to protect the diodes from power-up current surges when charging the 1000 uF capacitor (not shown) in the rectifier 174. In the circuitory described up to this point, the unregulated DC voltage preceding the voltage regulator is approximately 6 volts with a ripple voltage of approximately 1.5 volts p-p. The adjustable voltage regulator thus provides an accurate and stable voltage to the motor.

The voltage regulator 176 also includes a 100 ohm potentiometer (not shown) to provide a voltage that can be adjusted to account for tolerances in the motor and gears. The voltage regulator is also provided with a diode, D3, which provides additional voltage drop at low output voltages and a REFET transistor switch Q3 which turns the motor on and off via a signal from the motor control section 154. A heat sink rated at 18° C./w (not shown) is also incorporated into the circuit to dissipate the approximately 1 watt of power the voltage regulator generates and helps limit its Junction temperature to approximately 90° C. (194° F.) at 65° C. ambient temperature.

The motor control electronics section 154, shown in greater detail in FIG. 12 turns the motor on when the coffee maker is powered up and provides a delayed shutoff for the motor when the water has boiled through the heating tubes, as indicated by the opening of the thermostat.

As illustrated in FIG. 12, the motor control electronics section 154 includes the heater and thermostat 172 provided with a sense signal 178 connected to the thermostat output and via a line 180 to an optocoupler 182 positioned dowelstream of the heater, thermostat and sense signal, which optocoupler is in turn connected to a J-K flip flop 184 through a connecting line 186 and then through a line 188 to the motor 160. A capacitor 190 connected to ground is located between the optocoupler and J-K flip flop.

The J-K flip flop 184 which includes coupled NAND gates (not shown) also include a resistor 192 charging capacitor 190 (time constant=1 sec) to provide the power-up reset. The flip flop powers up with its /Q (U2, pin 4, not shown) output high. The /Q output is the on/off control to the motor switch transistor and turns the motor on at power up. At this time the coffee maker thermostat is closed, passing the 110 or 220 VAC to the heater and heating the water. The water keeps the heater tubing at approximately 100° C. When the water has boiled out of the tubing, the tubing temperature will rise and the thermostat will open. The motor control electronics monitors this with optocoupler 182 charging capacitor 190. At power-up and until the water boils out of the heater tubing, the optocoupler senses the current thru resistors R1 and R2 (not shown) included therein and charges the capacitor. The flip flop J input (U2, pin 8) monitors the capacitor and when the thermostat opens, the optocoupler ceases to charge the capacitor, the capacitor starts to discharge and the flip flop changes state, shutting off the motor when the voltage drops below the flip flop's threshold. The flip flop will remain in this state, keeping the motor off until power is cycled. When the thermostat closes again due to the heater tubing cooling, the capacitor will again be charged, but the state of the flip flop will remain the same until power is cycled. The RC time constant on the capacitor discharge is chosen high enough to generate a 10 to 15 second delay of motor shut off after completion of the brewing cycle. The resistors R1 and R2 limit the current input to the optocoupler to approximately 3 ma. Both R1 and R2 are used when the input voltage is 220 VAC and only one is used when the input voltage is 110 VAC. The motor control electronics uses the unregulated voltage from the motor drive electronics for power.

The coffee maker control electronics described incorporates several design features which contribute to its safe use. The transformer and the optocoupler and voltage are subjected to voltage rates in the order of thousands of volts from the 110 to 220 VAC power source. An earth ground connector is included for use in applications requiring it, preventing the transformers secondary voltage from floating. The voltage regulator itself has built in overcurrent protection which takes effect at approximately 1.3 A and thermal overload protection that turns the regulator off when the chip temperature exceeds about 170° C. Additional output current limiting for lower current values can be added as an option for protection from output short circuits and motor stall conditions.

It is to be understood that the above-described control circuit and the various elements thereof can be arranged to operate to carry out the required sequence of operations with known and readily available technology, the electrical and/or mechanical components thereof being readily available and readily adaptable by those skilled in the art to be linked together to cooperatively achieve the desired operational sequences that is to cause the high heating mode and rotation of the basket to operate sequentially or simultaneously and shut off while energizing the low heating mode to keep the coffee warm, as needed.

In accordance with this invention, a preferred basket means includes a plurality of narrow, elongated ports located on and extending around the upper circumferential wall of the basket. The location of the ports is selected to be above a level that the coffee grounds and the aqueous solution will ascend to along the wall of the basket due to centrifugal acceleration during rotation of the basket. A second frustro cone tapering outwardly in the upward direction and of lesser circumference is disposed directly below the upper circumferential wall. By locating the ports along the circumferential flanges of the upper and lower wall sections of the basket, the extract discharging from the basket is directed downward along the outside surface of the wall of the basket along the discharge chamber 90 and thence from there to the receptacle 16.

The plurality of ports in the basket are spaced apart substantially equidistantly by a plurality of ribs, such as 44. The width of the ribs should be minimized to maximize the area of the ports in order to allow the liquid extract to be removed from the aqueous solution and to pour out of the basket. In a preferred embodiment, the ribs between the ports are relatively equidistantly separated so as to prevent non-wetting of the coffee grounds during the mixing process.

The size of the ports will depend on the centrifugal acceleration, the angle of the wall of the basket, the quantity of coffee grounds and liquid and, as well, the particle size of the coffee grounds. A preferred port size is 0.125 inch.

Standard coffee paper filters, e.g., 3.5 inch diameter base, 5 inch top diameter and 2.25 inch vertical walls sloped at a 5°–15° angle can be employed in an apparatus according to this invention.

Where such standard coffee paper filters are utilized in an apparatus, in accordance with this invention, the paper filter, strip or band preferably has a thickness of about 0.0020 inch and is about 19 inches in length. Such filters are simply placed into the trough and under the lip of the basket, as described above, so that it covers the ports.

Still further, there can be placed within the basket, so as to substantially cover the entire inner wall surface thereof, a paper filter. The filter is frustro-conically shaped and has a smaller radius than the basket so as to nest therewithin on its inner wall surface. The filter may be formed of a fine wire or plastic mesh but typically is made of paper of 100 mesh size and serves to entrap and prevent coffee grounds particulates in the aqueous solution from passing out of the basket through the ports.

It is to be understood, however, that it is within the purview of the invention, that a wide variety of filter elements can be used in an apparatus according to the invention. For example, reusable filter elements, such as form filter structures of open-celled configuration and made from a material such as nylon acetate may be used. After use, such filters may simply be rinsed out and reused. On the other hand, permanent filter elements may also be employed. Such elements may be made of stainless steel microscreen construction or woven thermoplastic monofilament nylon or polypropylene and the like and may be permanently installed in the basket. After use, the basket may simply be rinsed out in order to clean such filter elements for reuse. Still further, a combination of permanent and replaceable filter elements may be employed with the replaceable element being discarded after use and the permanent element rinsed out for reuse.

A suitable motor 14 is a DC motor mounted on an upper portion of the vertical support arm but an AC motor also can be used. The motor has a friction involute drive wheel extending axially from the motor and having an outer flat surface which is located substantially perpendicular to the basket means. The weight of the motor alone or together with a spring (not shown) serves to bring the drive wheel into direct contact with the drive rim located at the top outer periphery of the basket. When the motor rotates the drive wheel, the drive wheel will cause the basket to rotate around its central axis at a preselected rotational speed.

As mentioned above, heating and liquid feeding means include a heater element located in the base and in fluid communication with the liquid reservoir. In order to brew 12 cups of coffee beverage, a 1000 watt heater element is sufficient.

The temperature of water discharging into the basket should be above about 185° F., preferably 190° F. and more preferably above about 192° F. The temperature of water discharging into the basket should be below about 195° F. and preferably below 193° F.

In a preferred embodiment, the total time for extraction is eight minutes measured from the time the liquid reaches the pre-determined temperature for 8 cups (U.S.) of brewed coffee. Moreover, circuitry and/or time switches, and time delay means may be provided to control the operation of the present invention and temperature sensitive devices such as thermocouples may also be employed for control purposes.

In an alternative embodiment, the present invention can be used to produce a highly concentrated coffee like espresso by simply employing less liquid and more ground coffee.

It now has been discovered that by controlling parameters of the method and apparatus of this invention, and more specifically by controlling the application of centrifugal acceleration and dwell time to a preheated aqueous solution containing coffee grounds, caffeol and other essential flavor and aroma components may be almost entirely and selectively extracted from the coffee grounds. This preselected centrifugal acceleration and dwell time have at least a three-fold effect on increased extraction of the coffee flavor and aroma components:

(1) all surfaces of the coffee grounds and each coffee ground particulate are uniformly wetted by the liquid, thus forming an aqueous solution;

(2) the liquid is driven through the surface and into the rigid structure of each coffee ground particulate; and (3) an oil (caffeol)-liquid emulsion is formed.

Surprisingly, it has further been found that this selected centrifugal acceleration and dwell time that causes the selective extraction of caffeol and other essential flavor and aroma components is controlled by the inter-relationship between: the rotation of the basket; the geometry of the basket including the angle of the basket wall(s) relative to the base and central axis, the diameter of the basket and the depth of the basket; the temperature of the liquid; and the location and the cross-sectional area of the filter.

A particular advantage of the arrangement described so far is that the rate of flow of the liquid through the coffee grounds, even though a continuous flow process is being used in which the aqueous solution is subjected to centrifugal acceleration, is determined solely by the configuration of the present invention. Hence, it is possible by resorting to the present invention to accurately control the dwell time of the liquid in contact with the coffee grounds, and then the degree of extraction of solubles from the coffee grounds.

The operation of the coffee-brewing apparatus will now be described.

Initially, a pre-determined amount of liquid is supplied to reservoir 6 and a corresponding amount of coffee grounds is placed in basket 12. Housing 10 and basket 12 are set as shown in FIG. 1.

For purposes of introducing the liquid to the reservoir, an opening (not shown) is provided in the support structure in the manner known in the art and the liquid is simply supplied through the opening and transmitted through pipes, as needed, into the reservoir.

After the liquid and coffee grounds have been so supplied to the apparatus, a switch (not shown) is operated which activates heater element 8 at a preselected temperature. When heater element 8 is activated, the liquid fed to heater element 8 from reservoir 6 is sequentially heated, thereby obtaining hot liquid. The boiling pressure raises the hot liquid through the tube 74 to hot liquid delivery area 72 sequentially. The hot liquid fed to delivery area 72 is then fed into basket 12 through discharge ports or outlets 78 and 80. Thereafter, the hot liquid uniformly permeates the ground coffee in basket 12.

Simultaneously or beforehand, motor 14 is energized, whereby the rotation of motor 14 is transmitted to drive wheel 20 which is in contact with basket 12. Thus, basket 12 is rotated around the central axis at a preselected rotational speed and thereby is subjected with its contents to a preselected centrifugal acceleration. The rotation of basket 12 causes a force in the radial direction which, in turn, causes the hot liquid-coffee grounds-mixture in basket 12 to uniformly mix and then disperse to the peripheral side wall and thus form an aqueous solution.

The hot liquid is discharged from hot liquid delivery area 72 toward the inner central portion of basket 12 to be thereby received by inner bottom of basket 12. Preferably, hot liquid delivery area outlet 72 includes a drip type nozzle for delivering the hot liquid dropwise and for uniformly dispersing hot liquid to thereby permeate coffee grounds coffee from the inner peripheral side. The extract containing desirable flavor components, is further caused by the centrifugal acceleration force to rise along the preselected angle of basket 12.

Furthermore, the aqueous solution passes through basket 12 in a pre-determined time due to the centrifugal acceleration in the radial direction with desirable flavor components extracted exiting ports 46 et seq. into the discharge passageway 90. The extract flows downward within the discharge passageway 90 through outlets 68 and 70, discharge spout 32 and into receptacle 16. After a pre-determined amount of time, heater element 8 and motor 14 are deactivated.

In operation, the rotation of basket 12 at a preselected speed of between about 270 and 400 revolutions per minute creates a centrifugal acceleration which causes water introduced into or already in basket 12 to form an aqueous solution with coffee grounds and an aqueous slurry containing the coffee grounds. Coarse particles of coffee grounds are segregated from the aqueous slurry by a filter means. Further rotation of the basket 12 creates a centrifugal acceleration which moves the aqueous slurry radially outwardly along the bottom of basket 12 and upwardly along the side walls of basket 12. When the aqueous solution passes over the circumferentially disposed ports in the side wall of basket 12, the heavier particles of coffee grounds are entrained in the aqueous solution while the liquid extract passes through the ports and out of basket 12 into the passageway leading to the coffee receptacle 16.

As mentioned elsewhere herein, uniformity of brewing conditions and wetting in a consistent manner are of importance in meeting the requirements of The Coffee Brewing Center of the Pan-American Coffee Bureau in accordance with Publication Nos. 126 and 128 referred to hereinabove. Moreover, while it is true that a "static bed" of coffee grounds with drip-type coffee will give a good cup of coffee where good wetting of the coffee grounds occurs, in accordance with drip-type coffee making systems, such systems are still disadvantageous since incomplete wetting of a coffee bed and waste of coffee grounds occurs due to the flow pattern of water tunnelling into the bed in such systems. This frequently results in uneven wetting of the bed.

In contrast, however, the "centrifugal" force, employed in the instant invention, results in substantially uniform distribution of coffee grounds in relationship to the central axis of the apparatus. Moreover, since water is substantially uniformly distributed in a radially outward flow path through the coffee grounds, uniform wetting of almost all of the coffee bed occurs. It has been found in accordance with the present invention, less than 5% of the coffee grounds are unreacted and uniform wetting is clearly achieved. Moreover, in accordance with the present invention, such a result is repetitively consistent. However, in order to achieve such repetitive consistency, the speed of rotation of the basket, should be carefully monitored. When the speed of rotation is too high, residence time within the bed is so short that there is insufficient time to completely wet the bed. At high rotational speeds, water may contact all of the coffee grounds, but the contact time being so short either not much desirable soluble components can be extracted selectively, or soluble and insoluble (bitter) components are forced out together with the desirable components. Consequently, in order to achieve uniformity and repetitive consistency, it is preferred to utilize rotational speeds within the above-mentioned ranges, the particular speed used being chosen in accordance with the teachings of this invention for a particular sized unit in order to meet the requirements of the Pan-American Coffee Bureau, as set forth in Publication Nos. 126 and 128, referred to hereinabove.

The apparatus and method of this invention present numerous advantages. For example, the inventive coffee brewing method and apparatus provide for selectively extracting increased amounts of the essential flavor and aroma components from coffee grounds while, at the same time, keeping to a minimum any extraction of the acids and undesirable ingredients.

Another advantage of this invention is that it provides a coffee brewing method and apparatus employing a basket having a plurality of discharge ports around its circumference in the upper portions of the basket wall and which contains a mixture of heated water and coffee grounds which is rotated about its central axis of the basket at a preselected speed which will dissolve water soluble components of the coffee grounds in the preheated water and form an aqueous solution containing caffeol and which then will force the aqueous solution radially outwardly of the basket through the discharge ports while retaining the coffee grounds in the basket in an efficient and simple manner that is relatively free of oscillation during its operation.

A further advantage of this invention is that it provides a brewing apparatus that is reliable, simple, inexpensive to manufacture, and is easy to use.

A further advantage of this invention is that it provides a coffee brewing apparatus and method, which can, in a very short time, selectively extract almost all the essential flavor and aroma components from coffee grounds and produce a cup of coffee which meets the requirements of the Coffee Brewing Center of the Pan-American Coffee Bureau in accordance with Publication Nos. 126 and 128 referred to herein.

Another advantage of the invention is that it provides a method of brewing coffee and a coffee brewing apparatus that minimizes the amount of coffee grounds required to obtain a desired amount of coffee flavor in the coffee extract. Still another advantage of this invention is that it provides a coffee brewing apparatus having an automatic hot water feed system. A still further advantage of the invention is that it provides a coffee brewing apparatus that is easy to clean and maintain.

Another advantage of the invention is that it provides a coffee brewing apparatus having a basket configured to hold coffee grounds and to accommodate the standard paper filters used in current drip-type coffee brewing apparatuses.

The accompanying drawings, referred to herein and constituting a part hereof, illustrate preferred embodiments of the present invention, and together with the description serve to further explain the present invention.

To the extent not already indicated, it also will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. A coffee brewing method comprising the steps of:
   (a) adding a preselected amount of coffee grounds to a basket having a base and a frusto-conically shaped wall extending upward the base at a preselected angle relative to the central axis of the basket;
   (b) rotating said basket around its central axis at a speed between about 200 rpm and about 500 rpm, said rotation of said basket forcing said coffee grounds to substantially evenly disperse in a radially outward direction along the bottom of the basket and to rise along the wall of said basket to a predetermined level;
   (c) dispersing a preselected and controlled amount of water at a predetermined temperature onto the coffee grounds in said basket as said basket is rotating and forming a coffee grounds-water mixture, the ratio of the water to coffee grounds in said basket being between about 17.5 ml water per gram coffee grounds and about 19 ml water per gram coffee grounds;
   (d) maintaining the rotation of the basket and forming an aqueous solution consisting essentially of caffeol and water which rises along the wall of said basket to said predetermined level;
   (e) selectively removing said aqueous solution but not said coffee grounds from said basket through a plurality of circumferential ports located in the wall of said basket just below said predetermined level; said ports being substantially equidistantly spaced from the base of said basket and essentially all of the aqueous solution being forced radially outwardly through said ports by said rotation of said basket leaving essentially only said coffee grounds in said basket;

(f) continuing said rotation of said basket at said speed of rotation until essentially all of said aqueous solution introduced into said basket has been separated from said coffee grounds and removed from said basket; and (g) collecting the separate aqueous solution in a receptacle.

2. A method according to claim 1 wherein the speed of rotation of the basket and the angle of the basket wall(s) relative to the base and central axis, the diameter of the basket and the depth of the basket, the temperature of the hot water, and the location and cross-sectional area of the circumferential ports are selected to accurately control the dwell time of the hot water in contact with the coffee grounds, and the degree of extraction of solubles from the coffee grounds.

3. A method according to claim 1 wherein the speed of rotation of the basket is controlled so that the hot water is substantially uniformly distributed in a radially outward flow path through the coffee grounds and uniform wetting of almost all of the coffee grounds occurs.

4. A method according to claim 1 wherein the preselected angle is between about 8° and about 9° relative to the central axis of the basket.

5. A method according to claim 1 wherein said basket is rotated between about 280 rpm and about 400 rpm.

6. A method according to claim 1 wherein the preselected and controlled amount of water is uniformly dispersed at a temperature between about 185° F. and about 195° F. onto the coffee grounds in the basket.

7. A coffee brewing method comprising the steps of:
(a) adding a preselected amount of coffee grounds to a basket having a base and a frusto-conically shaped wall extending upwardly from the base at an angle between about 8° and about 9° relative to the central axis of the basket;

(b) rotating said basket around its central axis at a speed between about 280 rpm and about 350 rpm, said rotation of said basket forcing said coffee grounds to substantially evenly disperse in a radially outward direction along the bottom of the basket and to rise along the wall of said basket to a predetermined level;

(c) uniformly dispersing a preselected and controlled amount of water at a predetermined temperature onto the coffee grounds in said basket and forming a coffee grounds water-mixture, the ratio of the water to coffee grounds in said basket being between about 17.5 ml water per gram coffee grounds and about 19 ml water per gram coffee grounds;

(d) maintaining the speed of rotation of said basket and forming an aqueous solution consisting essentially of caffeol and water which rises along the wall of said basket to said predetermined level;

(e) selectively removing said aqueous solution but not said coffee grounds from said basket through a plurality of circumferential ports located in the wall of said basket just below said predetermined level said portions being substantially equidistantly spaced from the base of said basket and essentially all of the aqueous solution being forced radially outwardly through said ports by said rotation of said basket leaving essentially only said coffee grounds in said basket;

(f) continuing said rotation of said basket at said speed of rotation until essentially all of said aqueous solution introduced into said basket has been separated from said coffee grounds and removed from said basket; and (g) collecting the separated aqueous solution in a receptacle.

* * * * *